Aug. 17, 1965
B. STEFANOV
3,201,713
REGULATED TRANSISTOR POWER SUPPLY FOR CONVERTING D.C. TO A.C.
Filed Nov. 2, 1959
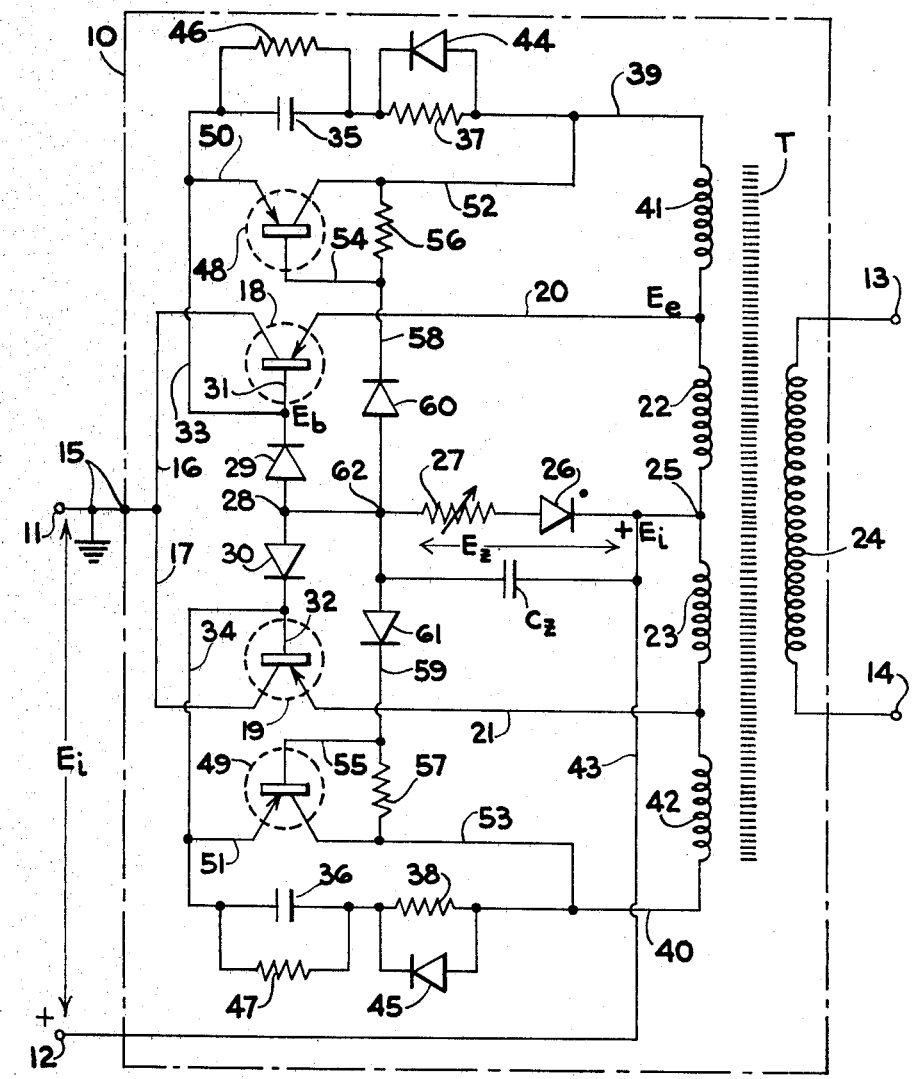
INVENTOR.
BORIS STEFANOV
BY
*Elliott & Pastoriza*
ATTORNEYS 3,201,713
REGULATED TRANSISTOR POWER SUPPLY FOR CONVERTING D.C. TO A.C.
Boris Stefanov, Glendale, Calif., assignor to Kauke & Company, Inc., a corporation of California
Filed Nov. 2, 1959, Ser. No. 850,202
3 Claims. (Cl. 331—113)

This invention relates generally to circuits for converting a direct input voltage into an alternating output voltage, and more particularly to an improved regulated transistor power supply circuit.

Portable power supplies for providing an alternating output voltage are well known in the art and find wide application in aircraft and missiles for supplying proper operating voltages to various instruments. These power supplies or converters preferably employ a pair of transistor type switching elements arranged to switch the polarity of an input direct voltage to provide an output alternating voltage. In aircraft and missile applications, such power supplies are generally energized from batteries. Over extended use however, the battery voltage tends to decrease. On the other hand in applications in which D.C. generators are employed, inherent variations in the operation of the generators themselves may cause variations in the input voltage feeding the power supplies.

To overcome variable output voltages resulting from variations in input voltage, it is common practice to provide regulating circuits between the output of the power supply and the various instruments to which the output is to be connected. These exterior regulators however constitute an additional cost item and moreover occupy extra space and add weight which factors can be very critical in the design of high altitude missiles.

Aside from the voltage regulation problem in power supplies of the foregoing type, the use of transistors themselves generally requires a large area for heat dissipation. Where high power output is required, this heat dissipation can become a serious problem. In the past, dissipation of heat has been effected by providing relatively large heat sinks for the collector terminals of the switching transistors. Since, however, the collector terminals in conventional power supplies are at an elevated voltage level, careful insulation is necessary.

Bearing all of the foregoing in mind, it is a primary object of the present invention to provide an improved power supply or converter circuit employing transistors which provides an extremely well regulated output voltage by incorporating suitable regulating means directly in the primary portion of the circuit itself to the end that auxiliary regulators and the like are avoided.

Another important object is to provide a power supply employing transistors having a relatively high power output and yet one which does not require a special insulated "heat sinks" or auxiliary cooling apparatus to the end that it can be housed in an extremely compact structure.

An auxiliary object is to provide, in addition to an improved input voltage regulation system, means for controlling the base current of the switching or power transistors themselves with variations in load, to the end that only the base current as is actually required by the switching transistor is drawn. As a consequence, excellent output regulation is achieved.

Briefly, these and many other objects and advantages of this invention are attained by providing a compact casing including first and second switching or power transistors having their collector terminals commonly connected together and grounded to the casing. The casing structure itself thus serves as a heat sink and is at ground potential. The emitter terminals connect to opposite ends of a split primary winding of a saturable core transformer having a center tap connecting directly to the second input terminal. Regulation is achieved by a zener type diode connected between the center tap and base terminals of the switching transistors.

In addition to the foregoing, there are provided suitable feed back coupling coils connecting to the base terminals of the transistors to effect the switching action upon saturation of the transformer core. In accordance with important features of the present invention, each feed back connection includes means to insure positive cut off of the non-conducting switching transistor. Also provided are base current control transistors connected between the feed back coils and the base terminals to draw base current in response to load variations so that the power or switching transistors themselves will only use the actual base current required to drive the load connected to the power supply.

A better understanding of the invention will be had by referring to a preferred embodiment thereof as illustrated in the accompanying circuit diagram.

Referring to the single drawing there is shown in heavy dash-dot outline a casing 10. Suitable first and second input terminals 11 and 12 pass into the left side of the casing and output terminals 13 and 14 extend from the right side. Direct voltage from either a D.C. generator or from a battery is supplied to the input terminal 11 and positive terminal 12. The regulated alternating output voltage in turn is provided at the output terminals 13 and 14.

Referring in detail to the circuit within the casing 10, the input terminal 11 is connected directly to the casing which is grounded as indicated at 15. This input terminal also connects to common collector terminals 16 and 17 of first and second switching transistors 18 and 19. The corresponding emitter terminals 20 and 21 in turn connect to primary winding halves 22 and 23 of an output saturable core transformer T. The secondary winding 24 connects to the output terminals 13 and 14 as shown.

A center cap connection 25 is provided between the primary halves 22 and 23 and connects through a zener diode 26 and variable series connected resistance 27 to a junction point 28. Junction point 28 connects through diodes 29 and 30 to the base terminals 31 and 32 respectively of the switching transistors 18 and 19. The zener diode 26 and resistance 27 constitute a voltage regulation means in the primary circuit.

The base terminals 31 and 32 are also connected respectively through leads 33 and 34, condensers 35 and 36, series connected resistances 37 and 38, to feed back leads 39 and 40 extending from the outer ends of feed back coils 41 and 42. As shown, the inner ends of the coils 41 and 42 connect to the emitter terminals leads 20 and 21. These coils are in flux coupling relationship with the primary winding halves 22 and 23. The input terminal 12 connects through a lead 43 to the center tap 25 so that positive input voltage is normally applied to this center tap point and to one side of the regulating zener diode 26. The resistances 37 and 38 in the feed back circuits are shunted by rectifiers 44 and 45 and the condensers are provided with discharge path resistances 46 and 47.

In the operation of the circuit described thus far, assume that a positive input voltage $E_i$ is applied between the terminals 11 and 12. This voltage will appear by way of the center tap 25 and coil halves 22 and 23 across the emitter and collector terminals of the transistors 18 and 19 since the collector terminals 16 and 17 are grounded to the first input terminal 11 as described heretofore. Because of dissimilarities in actual manufacture of the transistors, one or the other of the transistors 18 and 19 will commence conducting. Assume that transistor 18 starts conducting first. In this event, current will pass from the input terminal 12 through the center tap 25, primary winding halve 22, emitter terminal 20 to collector terminal 16 and ground at 15. The voltage developed in the primary halve 22 is coupled to the feed back coil 41 which will pass a negative voltage over the feed back line 39, resistance 37, condenser 35, and lead 33 to the base terminal 31 thereby turning on the transistor 18 to a fully conductive state. A corresponding positive voltage in the feed back coil 42 is applied to the base terminal 32 of transistor 19 insuring that this transistor is positively cut off.

Under conducting conditions, the difference between the input voltage $E_i$ and the voltage on the emitter terminal $E_e$ is primarly determined by the zener voltage $E_z$. This voltage will be constant and the flux build up will be uniform in the primary halve 22 until the core of the transformer becomes saturated. At this point, the generated voltage in the feed back coil tends to drop towards zero and the collapsing flux tends to reverse the coil current. This reverse current results in a positive voltage in the feed back coil 41 passing through the line 39 and directly through the rectifier 44 and condenser 35 to the base terminal 31 thereby cutting off the transistor 18. The condenser 35 provides a spike for positively shutting off the transistor.

The same current reversal in the primary windings is communicated in the form of a negative voltage from the feed back coil 42 through lead 40, resistance 38, condenser 36 and lead 34 to the base terminal 32 of the second switching transistor 19, turning this transistor on. When transistor 19 conducts, current will now flow from the center tap 25 through the primary halve 23, emitter terminal 21, and collector terminal 17 to ground 15. When the rate of change of flux in the winding halve 23 approaches zero as a result of saturation, the drop in voltage results in a positive signal from the feed back coil 42 which will pass directly through the rectifier 45 and condenser 36 to the base terminal 32 providing the heretofore mentioned positive spike for shutting off the transistor 19. Simultaneously, the reversal in the current in the primary of the transformer results in the turning on of the transistor 18, and the cycle is repeated.

The discharge path resistances 46 and 47 serve to discharge the condensers 35 and 36 during the reverse current portion of the cycle. The two rectifiers 29 and 30, connected between the junction point 28 and the base terminals 31 and 32, respectively, serve essentially as clipping circuits to limit the negative spikes appearing at the base terminals 31 and 32 to improve the output voltage wave shape. A condenser $C_z$ shunts the zener diode 26 and series resistance 27 to cushion the effects of these negative spikes and to provide a steady reference voltage during the switch over period.

It will be understood in the operation as described thus far that the voltage appearing across each primary halve when the correspondingly connected transistor is conducting is controlled by the zener voltage $E_z$. This is because the emitter voltage $E_e$ follows the base voltage $E_b$ during conduction and the difference between the base voltage and input voltage $E_i$ is always constant. For example if the input voltage should drop by two volts the base voltage $E_b$ would also instantly drop. This in turn drops the emitter voltage $E_e$ so that the voltage across the primary halve is still constant and equal to the difference $E_i-E_e$. Therefore, the secondary output voltage at output terminals 13 and 14 will be regulated notwithstanding variations in the initial input voltage $E_i$.

In order to avoid driving the switching transistors 18 and 19 unnecessarily when small loads are connected to the output terminals, there are provided a pair of base current control transistors shown at 48 and 49 respectively. These transistors have their emitter terminals 50 and 51 connected to the base terminals 31 and 32 of the switching transistors, and collector terminals 52 and 53 connected to the feed back leads 39 and 40. The base terminals 54 and 55 of the base current control transistors in turn connect from collector-base resistances 56 and 57 through leads 58 and 59, and rectifiers 60 and 61 to a junction point 62 connected directly to the junction point 28. During conduction of the transistor 18 for example and under heavy loading condition, base current will be drawn through the lead 33, emitter 50, collector 52, lead 39 and feed back coil 41 to emitter terminal 20. The same situation obtains when the transistor 19 is conducting under heavy load conditions. The resistances 56 and 57 respectively provide the necessary current through the zener diode to establish a reference voltage. The variable resistance 27 in conjunction with the resistance 56 or 57 depending on which transistor is conducting, provides a fine degree of control of this reference voltage as seen by the switching transistors.

From the foregoing description, it will be seen that the present circuit provides many advantages. First, as mentioned heretofore, the collector terminals of the switching transistors 18 and 19 in which most heat is generated are commonly connected together to the casing which is at ground potential. The casing itself thus serves as an ideal heat sink enabling the provision of a relatively small and compact structure for the power supply circuit and the avoidance of any insulated auxiliary heat sink. In addition, regulation is effected directly in the primary portion of the circuit thereby avoiding the necessity of large filtering condensers in the the output circuits and providing a high degree of output voltage regulation with a wide choice of output voltages. Finally, the provision of the series connected resistance and condenser and shunting rectifier in the feed back paths insures positive control in the cutting off of the transistors. Finally, the base current control transistors 48 and 49 provide only the base current required by the switching transistors for the particular load being powered.

Modifications falling clearly within the scope and spirit of this invention will occur to those skilled in the art. The regulated transistor power supply circuit is therefore not to be thought of as limited to the particular embodiment chosen merely for illustrative purposes.

What is claimed is:

1. A regulated transistor power supply circuit for converting a direct input voltage to an alternating output voltage comprising, in combination: a thermally conductive casing; a first input terminal grounded to said casing; a second input terminal for receiving said direct input voltage; first and second switching transistors having emitter, collector, and base terminals, said collector terminals being commonly grounded to said first input terminal and casing thereby providing a heat sink for said transistors; a saturable core transformer having split primary winding halves with a center tap therebetween, said second input terminal connecting to said center tap, said emitter terminals connecting to the opposite ends of said winding halves respectively; a pair of feed back coils in flux coupling relationship with said winding halves respectively; connecting means between first ends of said feed back coils and base terminals for feeding back current to said base terminals respectively, the other ends of said feed back coils connecting to said opposite ends of said winding halves respectively; a common junction point connected to said base terminals; a regulating zener diode connected at one end to said connection of said second input terminal to said center tap; a variable resistance connected in series with said zener diode between the other end of said diode and said junction point to hold the voltage difference between said input terminal and said junction point at a constant value determined by the setting of said variable resistance and the voltage at which said zener diode conducts, whereby the voltage applied across each split primary winding halve is constant during conduction through the corresponding emitter terminal connected thereto to provide a regulated voltage at said primary; a secondary winding in said transformer; and output terminals extending from said casing and connected to said secondary winding to provide said alternating output voltage.

2. The subject matter of claim 1, in which said connecting means between said feed back coils and base terminals each include a resistance and condenser in series; a rectifier shunting said resistance; and a high resistance discharge path shunting said condenser, said resistance and condenser providing feed back control currents to the corresponding base terminal connected thereto during conduction of the transistor control device controlled by said base current, and said rectifier and condenser passing positive cut off voltage to said base to terminate conduction of said last mentioned transistor upon conduction of the other switching transistor.

3. The subject matter of claim 2, including a pair of base current control transistors having emitter and collective terminals respectively connected between said base terminals of said switching transistors and said feed back coils, said control transistors drawing base current from said switching transistors in response to loading of said secondary winding to regulate said base current.

References Cited by the Examiner

UNITED STATES PATENTS

| | | | |
|---|---|---|---|
| 2,848,614 | 8/58 | Lyons | 331—113 |
| 2,874,293 | 2/59 | McMurren | 331—113 |
| 2,959,745 | 11/60 | Grieg | 331—113 |
| 3,070,759 | 12/62 | Brouwer | 331—113 |

OTHER REFERENCES

High-Power Trans. D.C. Converters by Pye in Electronic and Radio Engineer, March 1959, pages 96 to 105.

ROY LAKE, *Primary Examiner.*

GEORGE N. WESTBY, JOHN KOMINSKI, *Examiners.*